United States Patent
Cho et al.

(10) Patent No.: US 10,599,000 B2
(45) Date of Patent: Mar. 24, 2020

(54) SMART WINDOW

(71) Applicants: Samsung Display Co., Ltd, Yongin-si, Gyeonggi-do (KR); POSTECH ACADEMY-INDUSTRY FOUNDATION, Pohang-si, Gyeongsangbuk-do (KR)

(72) Inventors: Sang Hwan Cho, Suwon-si (KR); Jong Lam Lee, Pohang-si (KR); Chung Sock Choi, Seoul (KR); So Young Lee, Suwon-si (KR); Sun Young Jung, Suwon-si (KR); Illhwan Lee, Pohang-si (KR); Ki Ryong Jeong, Pohang-si (KR)

(73) Assignee: Samsung Display Co., Ltd. (KR)

( * ) Notice: Subject to any disclaimer, the term of this patent is extended or adjusted under 35 U.S.C. 154(b) by 0 days.

(21) Appl. No.: 15/435,227

(22) Filed: Feb. 16, 2017

(65) Prior Publication Data
US 2017/0371220 A1    Dec. 28, 2017

(30) Foreign Application Priority Data

Jun. 24, 2016   (KR) .................... 10-2016-0079657

(51) Int. Cl.
*G02F 1/01* (2006.01)
*G02F 1/1523* (2019.01)
(Continued)

(52) U.S. Cl.
CPC .......... *G02F 1/1523* (2013.01); *E06B 3/6722* (2013.01); *E06B 9/24* (2013.01);
(Continued)

(58) Field of Classification Search
CPC ........ G02F 1/1525; G02F 1/15; G02F 1/1521; G02F 1/1523; G02F 1/1506; G02F 1/163;
(Continued)

(56) References Cited

U.S. PATENT DOCUMENTS

| | | | |
|---|---|---|---|
| 7,633,668 B2* | 12/2009 | Das ...................... | C09K 9/02 252/583 |
| 2011/0043886 A1* | 2/2011 | Jeon ...................... | G02F 1/155 359/273 |

(Continued)

FOREIGN PATENT DOCUMENTS

| JP | 2009-129732 A | 6/2009 |
|---|---|---|
| KR | 10-2008-0040439 A | 5/2008 |
| KR | 10-10646480000 B1 | 9/2011 |
| KR | 10-2013-0044947 A | 5/2013 |
| KR | 10-2014-0073754 A | 6/2014 |
| WO | 2015160829 A1 | 10/2015 |

OTHER PUBLICATIONS

Araki et.al; "Electrochemical Optical-Modulation Device with Reversible Transformation Between Transparent, Mirror, and Black"; Adv. Mater. 2012, 24, OP122-OP126.

(Continued)

*Primary Examiner* — William R Alexander
*Assistant Examiner* — Henry A Duong
(74) *Attorney, Agent, or Firm* — Innovation Counsel LLP

(57) ABSTRACT

The present disclosure provides a smart window including a first base layer and a second base layer positioned to face each other; a first conductive layer and a second conductive layer respectively positioned at inner surfaces of the first base layer and the second base layer; and an electrolyte layer interposed between the first conductive layer and the second conductive layer, wherein the first conductive layer includes a plurality of first nanostructures, and the second conductive layer includes a plurality of second nanostructures having a different average length from the plurality of first nanostructures.

23 Claims, 12 Drawing Sheets

(51) Int. Cl.
| | |
|---|---|
| *G02F 1/1506* | (2019.01) |
| *E06B 3/67* | (2006.01) |
| *E06B 9/24* | (2006.01) |
| *G02F 1/155* | (2006.01) |
| *G02F 1/157* | (2006.01) |
| *G02F 1/163* | (2006.01) |

(52) U.S. Cl.
CPC ............ *G02F 1/155* (2013.01); *G02F 1/1506* (2013.01); *G02F 1/157* (2013.01); *G02F 1/163* (2013.01); *E06B 2009/2417* (2013.01); *E06B 2009/2464* (2013.01); *G02F 2202/36* (2013.01)

(58) Field of Classification Search
CPC ...... G02F 1/155; G02F 1/157; G02F 2202/36; G02F 2009/2464; G02F 1/1503; G02F 1/1508; G02F 1/15165; G02F 1/1524; G02F 1/15245; G02F 2001/15145; G02F 2001/1517; G02F 2001/164; G02F 2001/1518; C09K 9/02; E06B 9/24; E06B 3/6722; E06B 2009/2464; E06B 2009/2417
USPC ......................................................... 359/270
See application file for complete search history.

(56) References Cited

U.S. PATENT DOCUMENTS

| | | | |
|---|---|---|---|
| 2016/0139476 A1* | 5/2016 | Garcia | G02F 1/0123 |
| | | | 359/275 |
| 2016/0216588 A1* | 7/2016 | Ah | G02F 1/155 |
| 2017/0031224 A1* | 2/2017 | Gil | C01G 33/00 |
| 2017/0192334 A1* | 7/2017 | An | C07D 213/22 |
| 2018/0044581 A1* | 2/2018 | Sagisaka | C09K 9/02 |
| 2018/0252978 A1* | 9/2018 | Feng | B60R 1/04 |

OTHER PUBLICATIONS

Yu et al; "Nano-branched transparent conducting oxides: beyond the brittleness limit for flexible electrode applications"; Nanoscale. 2012, 4, 6831.

Extended European Search Report for 17176391.5 dated Nov. 8, 2017 (9 Pages).

Ranjit A Patil, et al., "Efficient electrochromic smart windows of one-dimensional pure brookite TiO2 nanoneedles", Solar Energy Materials & Solar Cells, Elsevier Journal, , Jan. 4, 2016, pp. 240-245, vol. 147, Elsevier Science Publishers, Amsterdam Neatherlands.

* cited by examiner

SMART WINDOW

RELATED APPLICATIONS

This application claims priority to and the benefit of Korean Patent Application No. 10-2016-0079657 filed in the Korean Intellectual Property Office on Jun. 24, 2016, the entire contents of which are incorporated herein by reference.

BACKGROUND

1. Field

The present embodiments relates to a smart window.

2. Description of the Related Art

A smart window is applied to a window, a mirror, or a display device, and is used as a way of controlling light transmittance. In detail, the smart window may be used in place of or with the regular window of a building or a vehicle, and may be controlled to a transparent setting in the winter, thereby allowing maximum sunlight into a room while being set to be opaque in the summer, thereby allowing only a desired amount of light through. In general, a smart window is classified into a liquid crystal display (LCD), a suspended particle display (SPD), electrochromic glass (EC), photochromic glass (PC), and a thermochromic glass (LTC) depending on a kind of a material representing a function. The above information disclosed in this Background section is only for enhancement of understanding of the background of the embodiments and therefore it may contain information that does not form the prior art that is already known in this country to a person of ordinary skill in the art.

SUMMARY

The present disclosure process a smart window that is capable of realizing various modes. A smart window according to an exemplary embodiment of the present disclosure includes: a first base layer and a second base layer positioned to face each other; a first conductive layer and a second conductive layer respectively positioned at inner surfaces of the first base layer and the second base layer; and an electrolyte layer interposed between the first conductive layer and the second conductive layer, wherein the first conductive layer includes a plurality of first nanostructures, and the second conductive layer includes a plurality of second nanostructures having a different average length from the plurality of first nanostructures.

The plurality of first nanostructures may have the average length in a range of 0.5 nm to 60 nm. The plurality of second nanostructures may have an average length in a range of 60 nm to 10 μm.

The electrolyte layer may include a solvent and an inorganic particle.

The inorganic particle may be at least one among $AgNO_3$, $CuCl_2$, $WO_3$, $TiO_2$, MgO, $MoO_3$, and NiO.

A volume ratio of the solvent and the inorganic particle may be in a range of 40:1 to 60:1. In a driving state in which a negative (−) voltage is applied to the first conductive layer, the smart window may have light reflectance of 40% or more.

A reflection layer positioned at a surface of the first conductive layer may be further included.

In the driving state in which the negative (−) voltage is applied to the second conductive layer, the smart window may have light reflectance of 70% or more. An absorption layer positioned at the surface of the second conductive layer may be further included.

The plurality of first nanostructures and the plurality of second nanostructures may be formed of at least one material among ITO (indium tin oxide), IZO (indium zinc oxide), ZITO (zinc indium tin oxide), GITO (gallium indium tin oxide), $In_2O_3$ (indium oxide), ZnO (zinc oxide), GIZO (gallium indium zinc oxide), GZO (gallium zinc oxide), FTO (fluorine tin oxide), and AZO (aluminum-doped zinc oxide).

An average thickness of the first conductive layer may be in the range of 5 nm to 100 nm.

An average thickness of the second conductive layer may be in the range of 50 nm to 10 μm.

A first electrode layer positioned between the first base layer and the first conductive layer may be further included.

A thickness of the first electrode layer may be in the range of 1 nm to 1 μm.

A second electrode layer positioned between the second base layer and the second conductive layer may be further included.

The thickness of the second electrode layer may be in the range of 1 nm to 1 μm. The first base layer and the second base layer may be formed of a polymer or a glass.

The polymer may include at least one selected from a group including polyester, polyethylene terephthalate (PET), polyphenylene sulfide (PPS), polystyrene, polyamide, polycarbonate, polymethyl methacrylate (PMMA), and polyethylene naphthalate (PEN).

In another aspect, the inventive concept includes a smart window having a first base substrate having a first nanostructure thereon, a second base substrate having a second nanostructure thereon, and an electrolyte layer between the first base substrate and the second base substrate. The electrolyte layer contains particles that precipitate on the first nanostructure or the second nanostructure in response to a voltage applied to at least one of the first nanostructure and the second nanostructure. The first nanostructure and the second nanostructure have different lengths such that particles that precipitate on the first nanostructure form a light-reflective surface and particles that precipitate on the second nanostructure form a light-absorbing surface.

The smart window according to an exemplary embodiment of the present disclosure may realize at least one mode among a transparent mode, a mirror mode, and a black mode.

DETAILED DESCRIPTION

Figure 1:
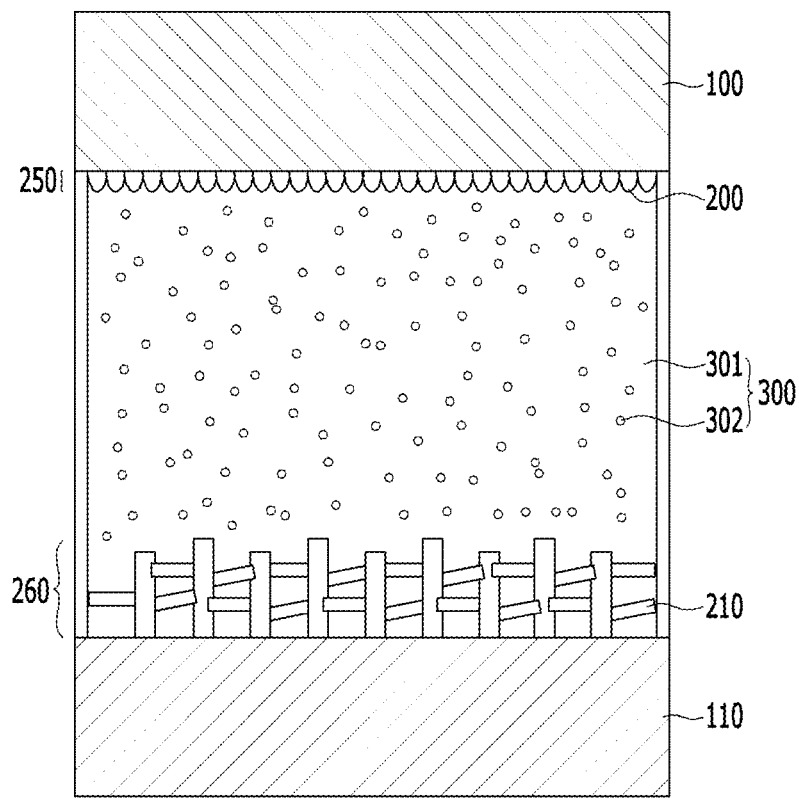
FIG. 1 is a schematic view of a smart window in an un-driven state according to an exemplary embodiment of the present disclosure.

Hereinafter, the present embodiments will be described more fully with reference to the accompanying drawings, in which exemplary embodiments of the embodiments are shown. As those skilled in the art would realize, the described embodiments may be modified in various different ways, all without departing from the spirit or scope of the present embodiments. Parts that are irrelevant to the description are omitted in order to clearly describe the present embodiments, and like reference numerals designate like elements throughout the specification. Further, in the drawings, a size and thickness of each element are arbitrarily represented for better understanding and ease of description, and the present embodiments is not limited thereto. In the drawings, the thickness of layers, films, panels, regions, etc., are exaggerated for clarity. In the drawings, the thickness of layers, films, panels, regions, etc., are exaggerated for convenience of description. It will be understood that when an element such as a layer, film, region, or substrate is referred to as being "on" another element, it can be directly on the other element or intervening elements may also be present. In addition, unless explicitly described to the contrary, the word "comprise" and variations such as "comprises" or "comprising" will be understood to imply the inclusion of stated elements but not the exclusion of any other elements. Further, in the specification, the word "on" means positioning on or below the object portion, but does not essentially mean positioning on the upper side of the object portion based on a gravity direction. Now, a smart window according to an exemplary embodiment of the present disclosure will be described with reference to FIG. 1 to FIG. 3.

Figure 2:
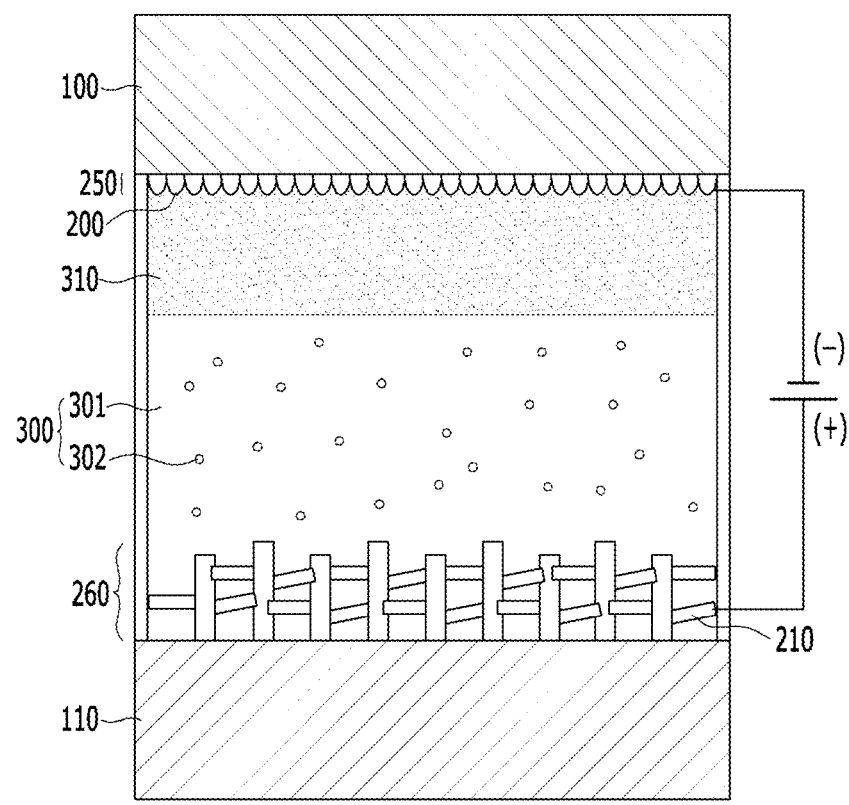
FIG. 2 and FIG. 3 are schematic views of a smart window in driven states according to an exemplary embodiment of the present disclosure.
Figure 3:
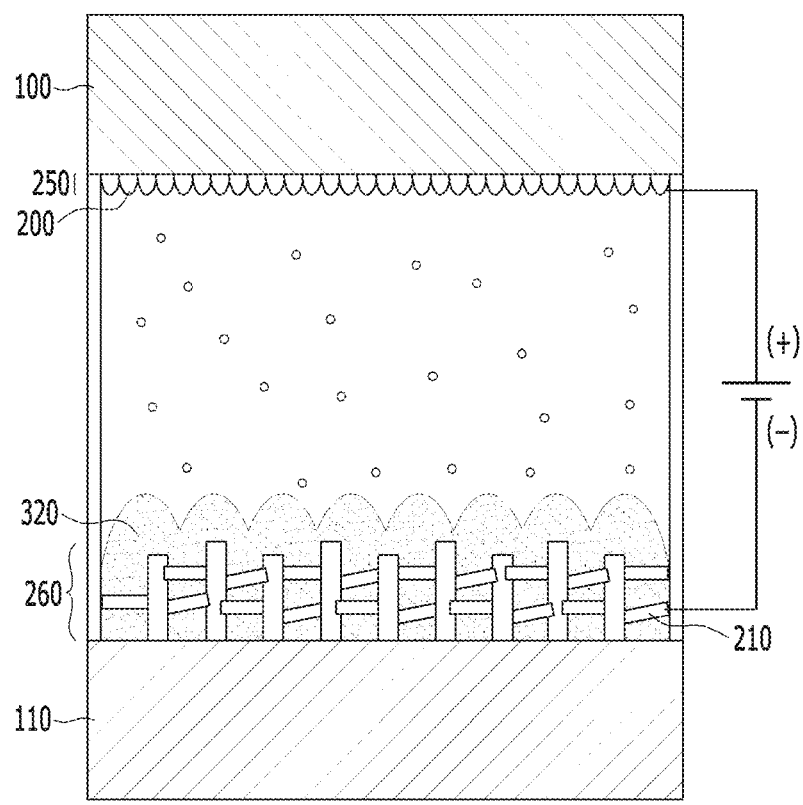

FIG. 1 is a schematic view of a smart window in an un-driven state according to an exemplary embodiment of the present disclosure, and FIG. 2 and FIG. 3 are schematic views of a smart window in driven states according to an exemplary embodiment of the present disclosure. Referring to FIG. 1, the smart window according to an exemplary embodiment of the present disclosure includes a first base layer 100, a first conductive layer 250, an electrolyte layer 300, a second conductive layer 260, and a second base layer 110. The first base layer 100 and the second base layer 110 are disposed to face each other. As used herein, the surfaces of the first and second base layers 100, 110 that are closest to each other are referred to as "inner surfaces." As used herein, "light" is intended to mean radiation in the visible wavelengths of the electromagnetic spectrum, namely about 400 nm to about 700 nm.

The first base layer 100 and the second base layer 110 may be made of a material that transmits at least about 60% of light. In some embodiments, the first base layer 300 and the second base layer 100 may transmit, about 65% to about 90%, or about 75% to about 100% of light. That is, the first base layer 100 and the second base layer 110, for example, may be made of a polymer or a glass, although this is not a limitation.

When the first base layer 100 and the second base layer 110 are made of the polymer, the resulting smart window will have bendability such that a flexible smart window is achieved. The polymer, for example, may include at least one material selected from a group including polyester, polyethylene terephthalate (PET), polyphenylene sulfide (PPS), polystyrene, polyamide, polycarbonate, polymethyl methacrylate (PMMA), and polyethylene naphthalate (PEN), but it is not limited thereto. In the present disclosure, the materials of the first base layer 100 and the second base layer 110 may be the same as or different from each other. The first conductive layer 250 and the second conductive layer 260 are respectively positioned at inner surfaces of the first base layer 100 and the second base layer.

An average thickness of the first conductive layer 250 may be about 5 nm to about 100 nm, about 10 nm to about 80 nm, or about 20 nm to about 70 nm. The average thickness of the first conductive layer 250 being in this value range ensures a desired level of electrical conductivity of the first conductive layer 250. As for the second conductive layer 260, its average thickness may be about 50 nm to about 10 μm, about 70 nm to about 5 μm, or about 100 nm to about 2 μm To ensure that the electrical conductivity of the second conductive layer 260 is at a desired level. Next, the first conductive layer 250 and the second conductive layer 260 may respectively include a plurality of first nanostructures 200 and a plurality of second nanostructures 210. The plurality of first nanostructures 200 may include parts that partially cross and connect to each other. Similarly, the plurality of second nanostructures 200 may include parts that partially cross and connect to each other.

In the present disclosure, the first conductive layer 250 may be formed as the plurality of first nanostructures 200 overlap with each other as they grow, and partially crossing and connecting to each other to form an irregularly-shaped structure. Similarly, the second conductive layer 260 may be formed as the plurality of second nanostructures 210 overlap with each other as they grow, partially crossing and connecting to each other to form an irregularly-shaped structure. Accordingly, the first conductive layer 250 and the second conductive layer 260 may include a predetermined gap therein. A defect due to a crack and the like may be prevented even with repeated bending when realizing the flexible smart window.

The plurality of first nanostructures 200 and the plurality of second nanostructures 210 may be made of the transparent conductive material of which the transmittance of light is at least about 60%. In some embodiments, the transparent conductive material may transmit about 65% to about 100% of light, or about 75% to about 100% of light. Since the plurality of first nanostructures 200 and the plurality of second nanostructures 210 are made of the material of which light transmittance of the visible ray region satisfies the value range, the realizing of a transparent mode is possible in a state in which the smart window is not driven, that is, a state that a voltage is not applied to the first conductive layer 250 and the second conductive layer 260. In the present disclosure, "transparent mode" indicates that the transmittance of light incident on the smart window from the outside is at least 60%. The transparent conductive material, for example, may be at least one of ITO (indium tin oxide), IZO (indium zinc oxide), ZITO (zinc indium tin oxide), GITO (gallium indium tin oxide), $In_2O_3$ (indium oxide), ZnO (zinc oxide), GIZO (gallium indium zinc oxide), GZO (gallium zinc oxide), FTO (fluorine tin oxide), and AZO (aluminum-doped zinc oxide), but it is not limited thereto. Also, the materials of the plurality of first nanostructures 200 and the plurality of second nanostructures 210 may be the same as or different from each other. On the other hand, the plurality of first nanostructures 200 may have an average length in a range of about 0.5 nm to about 60 nm. The average length of the plurality of first nanostructures 200, for example, may be in a range of about 1 nm to about 40 nm or about 1 nm to about 25 nm.

In the present specification, "average length" of the nanostructure means an average length of a longest node in each of the plurality of first nanostructures 200 and/or the plurality of second nanostructures 210. That is, the first nanostructure 200 and the second nanostructure 210 have a branching node structure, and the average length represents an average value of the longest nodes in each nanostructure.

Also, the nanostructure having the branching node structure may be obtained by being grown by using an E-beam evaporation method and may be appropriately controlled to be grown to a desired size, thereby respectively forming a plurality of first nanostructures 200 and a plurality of second nanostructures 210.

Referring to FIG. 2, a switch system connected to a power source is turned on to drive the smart mirror. In the example that is depicted, a negative (−) voltage is applied to the first conductive layer 250, some positive ions among inorganic particles 302 included in the electrolyte layer 300 may be coupled to the plurality of first nanostructures 200. Accordingly, a reflection layer 310 having a predetermined thickness may be formed at the surface of the first conductive layer 250. The reflection layer 310 is made of an aggregation material precipitated as the positive ion of the inorganic particle 302 receives a negative (−) charge from the first conductive layer 250. Also, since the reflection layer 310 is formed at the surface of the first conductive layer 250 including the first nanostructure having the average length that is relatively smaller than the average length of the second nanostructure, the reflection layer 310 may be formed to have a substantially flat surface. That is, when the negative (−) voltage is applied to the first conductive layer 250, the reflectance of the incident light of the smart window from the outside is increased by the reflection layer 310 having the substantially flat surface. In this case, the plurality of first nanostructures 200 may have the average length in a range of about 0.5 nm to about 60 nm as described above. When the average length of the plurality of first nanostructures 200 satisfies the above value range, the light reflectance of the smart window according to the present disclosure is in the range of about 40% or more, about 50% to about 100%, or about 60% to about 100% when the voltage (−) is applied to the first conductive layer 250.

In the present disclosure, "mirror mode" indicates that at least 40% of the light incident on the smart window from the outside is reflected. Next, the plurality of second nanostructures 210 may have the average length in the range of about 60 nm to 10 μm. The average length of the plurality of second nanostructures 210, for example, may be in the range of 60 nm to 1 μm, 70 nm to 300 nm, or 100 nm to 250 nm.

Referring to FIG. 3, the switch system drives the smart window by applying state the negative (−) voltage to the second conductive layer 260. In response to the voltage, some of the positive ions among the inorganic particles 302 included in the electrolyte layer 300 migrate to the plurality of second nanostructures 210. Accordingly, an absorption layer 320 having a predetermined thickness may be formed at the surface of the second conductive layer 260. The absorption layer 320 is made of the aggregation material precipitated as the positive ions of the inorganic particle 302 receive the negative (−) charge from the second conductive layer 260. Also, since the absorption layer 320 is formed at the surface of the second conductive layer 260 including the second nanostructure having the average length that is relatively larger than the average length of the first nanostructure, the absorption layer 320 may be formed to have a rough surface structure.

That is, when the negative (−) voltage is applied to the second conductive layer 260, the absorption of the light incident to the smart window from the outside is increased due to a plasmon effect and a scattering effect by the absorption layer 320 having the rough surface. In this case, the plurality of second nanostructures 210 may have the average length of about 60 nm to 10 μm as described above.

In the case that the average length of the plurality of second nanostructure 210 satisfies the above value range, when the negative (−) voltage is applied to the second conductive layer 260, at least about 70% of rays incident on the smart window gets absorbed. In some embodiments, about 75% to about 100% of incident radiation is absorbed, or about 80% to about 100% of incident radiation is absorbed. In the present disclosure, "black mode" indicates that the absorption of the radiation incident to the smart window from the outside is at least 70%. Accordingly, the smart window according to present disclosure in an exemplary embodiment makes the transparent mode possible when no voltage is applied, and makes the mirror mode and the black mode possible by adjusting a direction in which the negative (−) voltage is applied (e.g., by using AC power). On the other hand, the electrolyte layer 300 may include a solvent 301 and an inorganic particle 302. When the smart window is in the un-driven state, the inorganic particle 302 may exist to be dispersed in the solvent 301 in the ion state. Accordingly, light incident on the smart window in an un-driven state from the outside may be easily transmitted between the inorganic particles 302 in the ion state.

Also, as described above, since the first conductive layer 250 and the second conductive layer 260 are made of the transparent material, the transparent mode may be achieved. In the transparent mode, light transmittance may be about 60% or more, about 65% to about 100%, or about 75% to about 100%. Also, when the smart window is in the driving state, some of the positive ions among the inorganic particles 302 that are dispersed in the solvent 301 and exist in the ion state move to a side where the negative (−) voltage is applied and are coupled to the plurality of first nanostructures 200 or the plurality of second nanostructures 210. Accordingly, light incident on the smart window in the driven state from the outside may be reflected or absorbed by the plurality of first nanostructures 200 or the plurality of second nanostructures 210 coupled with the positive ions. That is, both the reflection mode and the black mode may be achieved. The inorganic particle 302 may be at least one among $AgNO_3$, $CuCl_2$, $WO_3$, $TiO_2$, $MgO$, $MoO_3$, and $NiO$, but it is not limited thereto. Also, a volume ratio of the solvent 301 and the inorganic particle 302 included in the electrolyte layer 300 may be about 40:1 to 60:1, or about 45:1 to 55:1. When the volume ratio of the solvent 301 and the inorganic particle 302 satisfies the above value range, the mirror mode and the black mode may both be realized.

Figure 4:
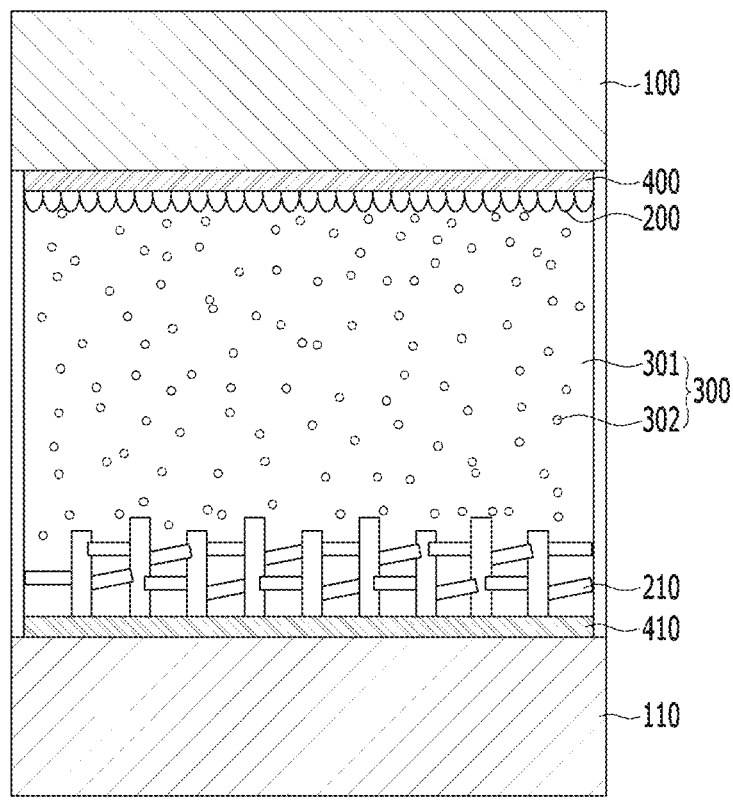
FIG. 4 is a cross-sectional schematic view of a smart window in an un-driven state according to another exemplary embodiment of the present disclosure.

FIG. 4 is a cross-sectional schematic view of a non-driving state of a smart window according to another exemplary embodiment of the present disclosure. Referring to FIG. 4, the smart window according to another exemplary embodiment of present disclosure may further include a first electrode layer 400 positioned between the first base layer 100 and the first conductive layer 250. Also, a second electrode layer 410 positioned between the second base layer 110 and the second conductive layer 260 may be further included. Other configurations except for the first electrode layer 400 and the second electrode layer 410 are the same as above-described such that the detailed description thereof is omitted.

The first electrode layer 400 may have a thickness of about 1 nm to about 1 μm, or about 10 nm to about 1 μm. Also, the second electrode layer 410 may have a thickness of about 1 nm to about 1 μm, or about 10 nm to about 1 μm. The thicknesses of the first electrode layer 400 and the second electrode layer 410 may be the same as or different from each other. Also, the material forming the first electrode layer 400 and the second electrode layer 410 may be a transparent conductive material that transmits at least 60% of light. In some embodiments, about 65% to about 100% of visible rays may be transmitted, or about 75% to about 100% in other embodiments. As above-described, when the smart window according to the present disclosure further includes the first electrode layer 400 and/or the second electrode layer 410, since the excellent electrical conductivity may be obtained, conversion from the mirror mode to the black mode and the conversion to the transparent mode in the un-driven state may be quickly realized depending on the current direction.

Next, the present disclosure will be described in detail through exemplary embodiments.

Exemplary Embodiment 1

The electrode layer is formed on the first glass substrate (the base layer) with the thickness of 150 nm by using ITO. Next, the conductive layer including the plurality of nanostructures of which the average length of the nanostructure is 1 nm is formed by growing ITO on the electrode layer through the E-beam evaporation. Further, an ITO electrode layer of the thickness of 150 nm is formed at the third glass substrate. Next, the third glass substrate and the first glass substrate are combined such that the ITO electrode layer of the third glass substrate and the conductive layer of the first glass substrate to seal edges thereof except for an injection hole. Subsequently, an electrolyte in which $AgNO_3$ at 0.5 mmol per 10 ml of DMSO is dispersed is injected into the injection hole and the injection hole is sealed, thereby manufacturing the smart window.

Exemplary Embodiment 2

Figure 5:
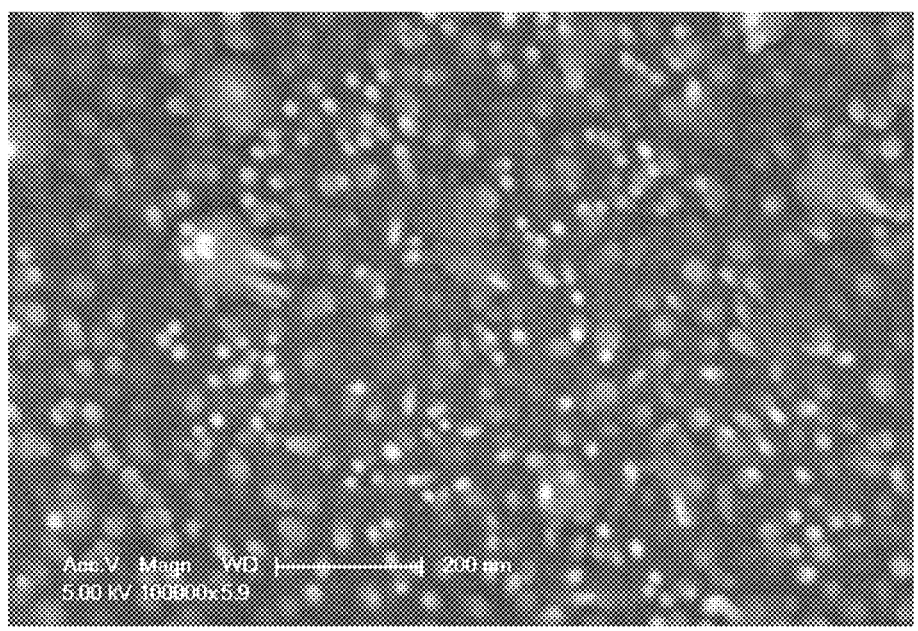
FIGS. 5, 6, 7, 8, 9, 10, 11, and 12 are plane SEM photos of a plurality of nanostructures included in a conductive layer in a smart window manufactured according to Exemplary Embodiments 2 to 9.

As confirmed in a plane SEM photo of FIG. 5, the smart window is manufactured by the same method as Exemplary Embodiment 1, except for forming the conductive layer including the plurality of nanostructures of which the average length of the nanostructure is 23.55 nm.

Exemplary Embodiment 3

Figure 6:
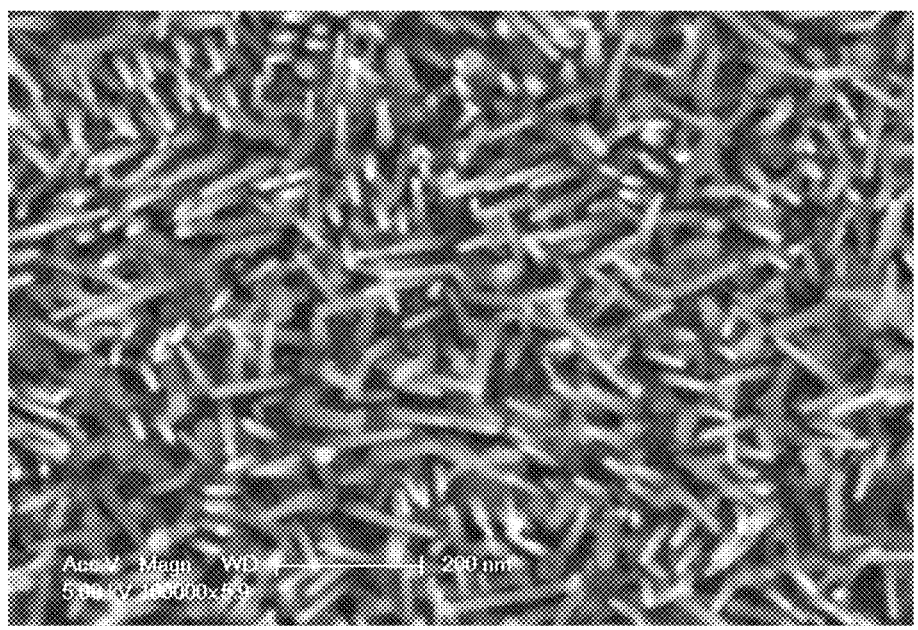

The electrode layer is formed at the second glass substrate (the base layer) with a thickness of 150 nm by using ITO. Next, by growing the ITO on the electrode layer by using the E-beam evaporation, as confirmed in the plane SEM photo of FIG. 6, the conductive layer including the plurality of nanostructures of which the average length of the nanostructure is 65.13 is formed. Further, an ITO electrode layer of the thickness of 150 nm is formed at the third glass substrate. Next, the third glass substrate and the second glass substrate are disposed to face the ITO electrode layer of the third glass substrate and the conductive layer of the second glass substrate to seal the edges thereof except for the injection hole. Next, the electrolyte in which $AgNO_3$ at 0.5 mmol per 10 ml of DMSO is dispersed is injected into the injection hole and the injection hole is sealed, thereby manufacturing the smart window.

Exemplary Embodiment 4

Figure 7:
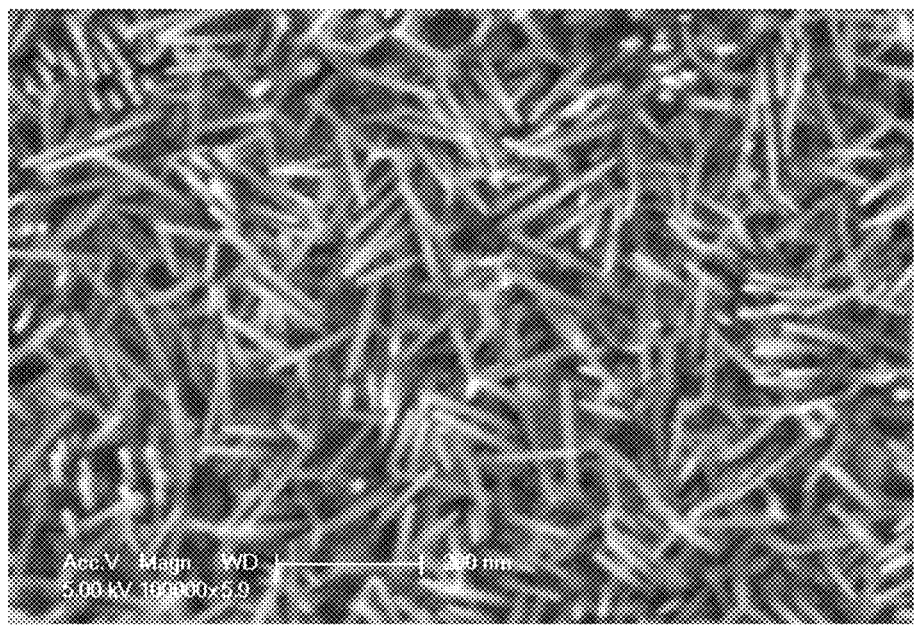

As confirmed in the plane SEM photo of FIG. 7, the smart window is manufactured by the same method as Exemplary Embodiment 3, except for forming the conductive layer including the plurality of nanostructures of which the average length of the nanostructure is 77.57 nm.

Exemplary Embodiment 5

Figure 8:
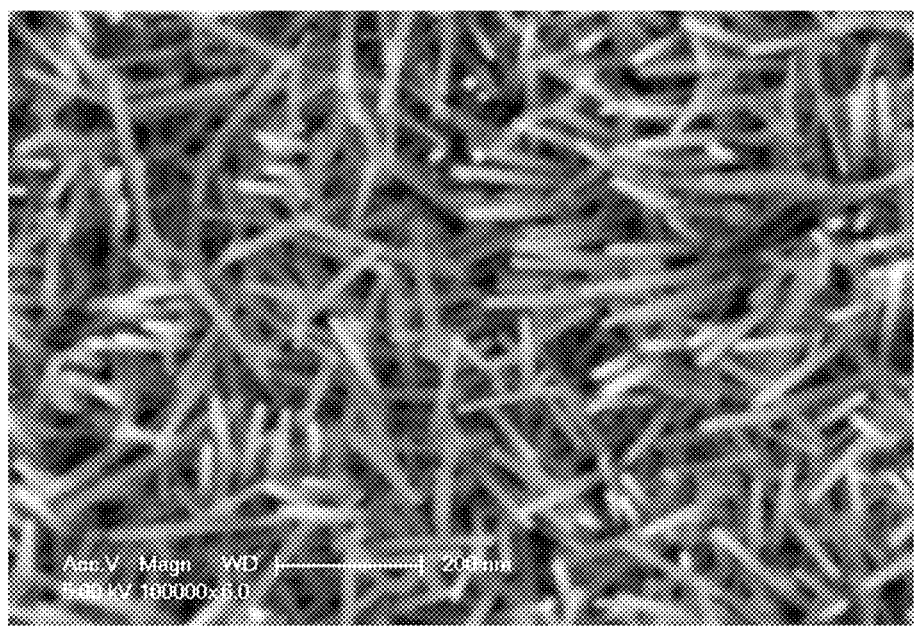

As confirmed in the plane SEM photo of FIG. 8, the smart window is manufactured by the same method as Exemplary Embodiment 3, except for forming the conductive layer including the plurality of nanostructures of which the average length of the nanostructure is 103.95 nm.

Exemplary Embodiment 6

Figure 9:
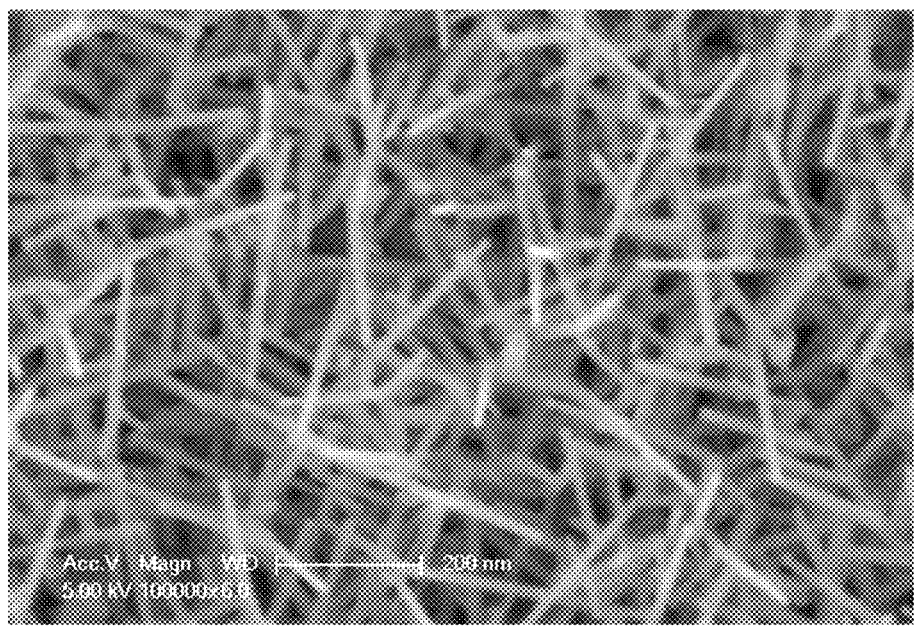

As confirmed in the plane SEM photo of FIG. 9, the smart window is manufactured by the same method as Exemplary Embodiment 3, except for forming the conductive layer including the plurality of nanostructures of which the average length of the nanostructure is 144.82 nm.

Exemplary Embodiment 7

Figure 10:
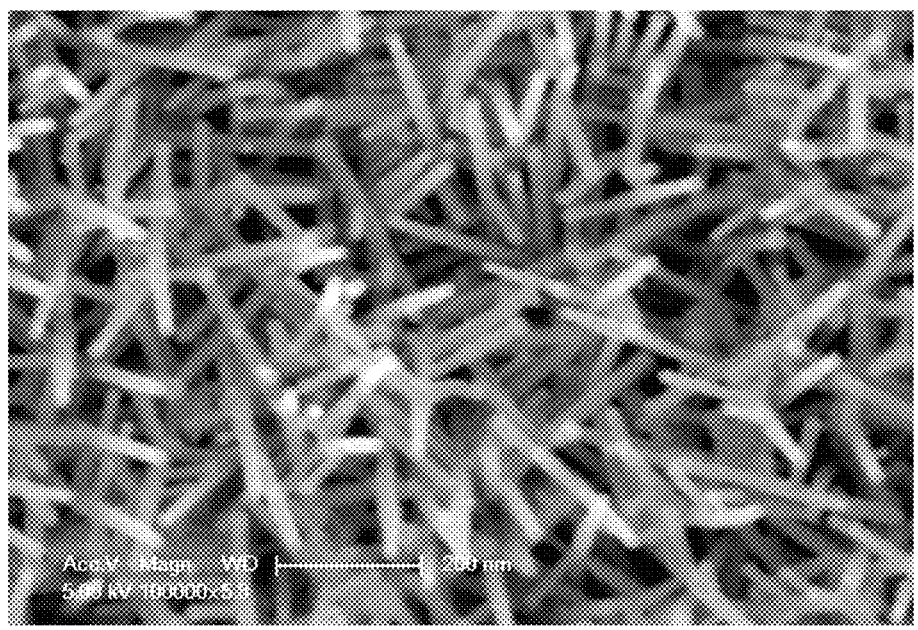

As confirmed in the plane SEM photo of FIG. 10, the smart window is manufactured by the same method as Exemplary Embodiment 3, except for forming the conductive layer including the plurality of nanostructures of which the average length of the nanostructure is 164.3 nm.

Exemplary Embodiment 8

Figure 11:
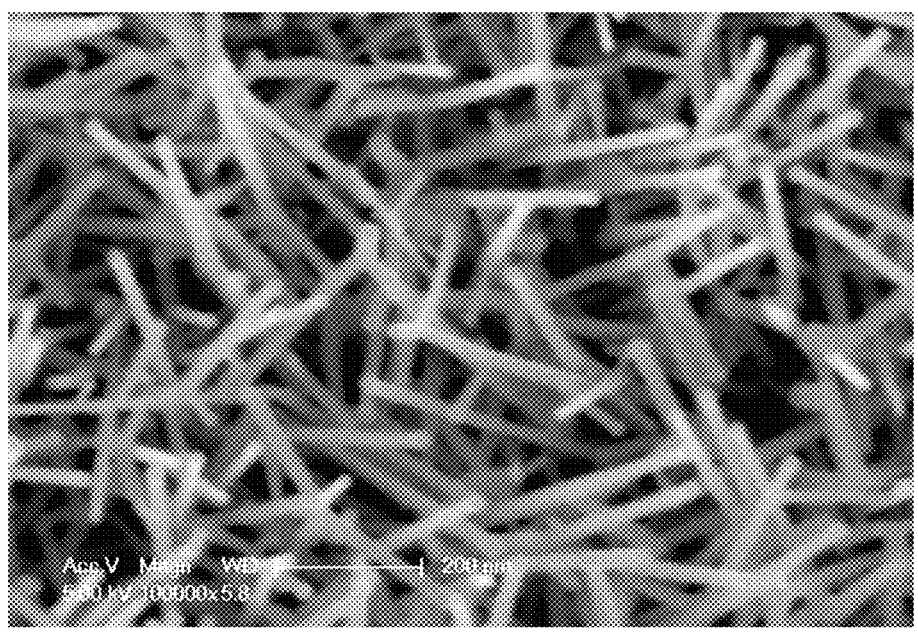

As confirmed in the plane SEM photo of FIG. 11, the smart window is manufactured by the same method as Exemplary Embodiment 3, except for forming the conductive layer including the plurality of nanostructures of which the average length of the nanostructure is 191.77 nm.

Exemplary Embodiment 9

Figure 12:
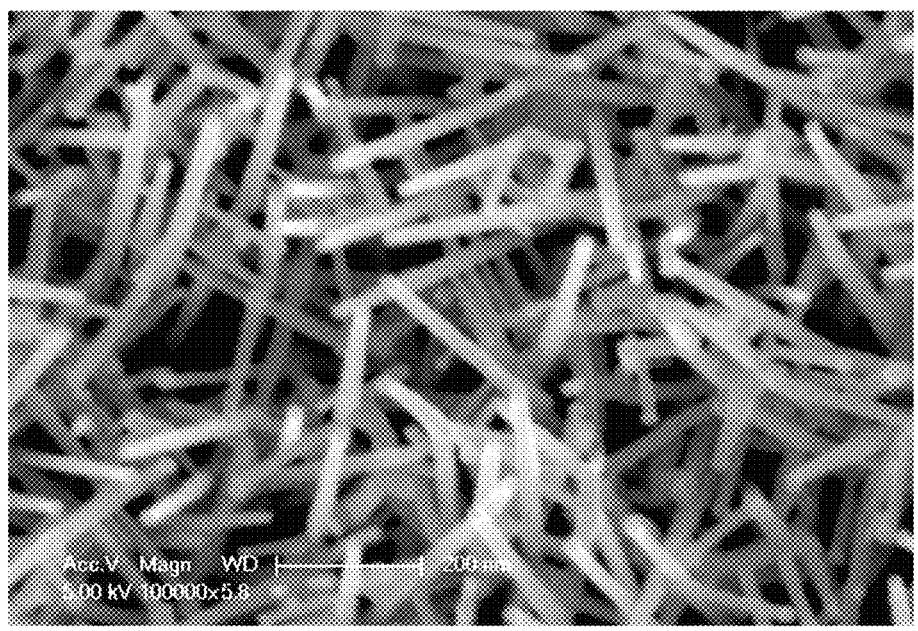

As confirmed in the plane SEM photo of FIG. 12, the smart window is manufactured by the same method as Exemplary Embodiment 3, except for forming the conductive layer including the plurality of nanostructures of which the average length of the nanostructure is 213.72 nm.

Experimental Example 1—Growth Confirmation of a Nanostructure

The plane SEM photos to confirm that the plurality of nanostructures included in the conductive layer are grown in the smart window manufactured according to Exemplary Embodiments 2 to 9 are respectively shown in FIG. 5 to FIG. 12. In FIG. 5 to FIG. 12, a shape of which the plurality of nanostructures according to Exemplary Embodiments 2 to 9 are respectively grown may be confirmed.

Experimental Example—Test of a Smart Window

By applying the voltage of 2.5 V so as to apply the negative (−) voltage to the side including the plurality of nanostructures in the smart window manufactured according to Exemplary Embodiments 1 to 9, the average light reflectance and the average light absorption are measured in the region of 400 nm to 700 nm. Further, in the un-driven state, that is, at the voltage of −0.5 V or 0.5 V, the average light transmittance value is measured in the range of 400 nm to 700 nm. Results thereof are shown in Table 1 below.

TABLE 1

| Division | Average light reflectance (%) | Average light absorption (%) | Average light transmittance (%) |
|---|---|---|---|
| Exemplary Embodiment 1 | 78 | 21.07 | 80.75 |
| Exemplary Embodiment 2 | 59.9 | 39.98 | 78.05 |
| Exemplary Embodiment 3 | 20.08 | 79.67 | 74.41 |
| Exemplary Embodiment 4 | 11.83 | 88.29 | 74.16 |
| Exemplary Embodiment 5 | 8.16 | 92.28 | 73.85 |
| Exemplary Embodiment 6 | 8.78 | 88.58 | 73.76 |
| Exemplary Embodiment 7 | 8.6 | 90.84 | 70.72 |
| Exemplary Embodiment 8 | 8.62 | 91.11 | 68.44 |
| Exemplary Embodiment 9 | 8.92 | 90.93 | 65.54 |

Referring to Table 1, in a case of the smart window according to Exemplary Embodiments 1 and 2 of which the average length of the plurality of first nanostructures satisfies the range of 0.5 nm to 60 nm, an average reflectance is at least 40% or more such that it may be confirmed that the realization of the mirror mode is possible. Also, in a case of the smart window according to Exemplary Embodiments 3 to 9 of which the average length of the plurality of second nanostructures satisfies the range of 60 nm to 10 μm, an average absorption rate is at least 70% or more such that it may be confirmed that the realization of the black mode is possible. On the other hand, when the smart window according to Exemplary Embodiments 1 to 9 is in the non-driving state, since the smart window has light transmittance of at least 60% or more, it may be confirmed that the realization of the transparent mode is possible. Particularly, the smart window according to an exemplary embodiment of the present disclosure including the first conductive layer including the first nanostructure having the average length of the range of 0.5 nm to 60 nm and the second conductive layer including the second nanostructure having the average length of the range of 60 nm to 10 μm is provided. In this case the transparent mode, the mirror mode, and the black mode may all be realized. For example, when realizing the smart window by growing the plurality of nanostructures of which the average length is 1 nm to the first conductive layer like Exemplary Embodiment 1 and by growing the plurality of nanostructures of which the average length is 23.55 nm to the second conductive layer like Exemplary Embodiment 2, as confirmed in Table 1, since the average light absorption is low, it may be confirmed that the realization of the black mode is difficult even if the application direction of the negative (−) voltage is changed. For example, when realizing the smart window by growing the plurality of nanostructures of which the average length is 65.13 nm to the first conductive layer like Exemplary Embodiment 3 and by growing the plurality of nanostructures of which the average length is 77.57 nm to the second conductive layer like Exemplary Embodiment 4, as confirmed in Table 1, since the average light absorption is low, it may be confirmed that the realization of the mirror mode is difficult even if the application direction of the negative (−) voltage is changed. While this embodiments has been described in connection with what is presently considered to be practical exemplary embodiments, it is to be understood that the embodiments is not limited to the disclosed embodiments, but, on the contrary, is intended to cover various modifications and equivalent arrangements included within the spirit and scope of the appended claims.

DESCRIPTION OF SYMBOLS

100: second base layer
110: second base layer
200: first nanostructure
210: second nanostructure
250: first conductive layer
260: second conductive layer
301: solvent
302: inorganic particle
300: electrolyte layer
310: reflection layer
320: absorption layer
400: first electrode layer
410: second electrode layer

What is claimed is:

1. A smart window comprising:
a first base layer and a second base layer positioned to face each other;
a first conductive layer and a second conductive layer respectively positioned at inner surfaces of the first base layer and the second base layer; and
an electrolyte layer interposed between the first conductive layer and the second conductive layer,
wherein the first conductive layer includes a plurality of first nanostructures, and the second conductive layer includes a plurality of second nanostructures, wherein an average length of the plurality of first nanostructures is different from an average length of the plurality of second nanostructures.

2. The smart window of claim 1, wherein the average length the plurality of first nanostructures is in a range of 0.5 nm to 60 nm.

3. The smart window of claim 1, wherein the average length the plurality of second nanostructures is in a range of 60 nm to 10 μm.

4. The smart window of claim 1, wherein the electrolyte layer includes a solvent and an inorganic particle.

5. The smart window of claim 4, wherein the inorganic particle is at least one among $AgNO_3$, $CuCl_2$, $WO_3$, $TiO_2$, $MgO$, $MoO_3$, and $NiO$.

6. The smart window of claim 4, wherein a volume ratio of the solvent and the inorganic particle is in a range of 40:1 to 60:1.

7. The smart window of claim 1, wherein in a driving state in which a negative (−) voltage is applied to the first conductive layer, the smart window has light reflectance of 40% or more.

8. The smart window of claim 7, further comprising a reflection layer positioned at a surface of the first conductive layer.

9. The smart window of claim 1, wherein in a driving state in which a negative (−) voltage is applied to the second conductive layer, the smart window has light reflectance of 70% or more.

10. The smart window of claim 9, further comprising an absorption layer positioned at the surface of the second conductive layer.

11. The smart window of claim 1, wherein the plurality of first nanostructures and the plurality of second nanostructures are formed of at least one material among ITO (indium tin oxide), IZO (indium zinc oxide), ZITO (zinc indium tin oxide), GITO (gallium indium tin oxide), $In_2O_3$ (indium oxide), ZnO (zinc oxide), GIZO (gallium indium zinc oxide), GZO (gallium zinc oxide), FTO (fluorine tin oxide), and AZO (aluminum-doped zinc oxide).

12. The smart window of claim 1, wherein an average thickness of the first conductive layer is in a range of 5 nm to 100 nm.

13. The smart window of claim 1, wherein an average thickness of the second conductive layer is in a range of 50 nm to 10 µm.

14. The smart window of claim 1, further comprising a first electrode layer positioned between the first base layer and the first conductive layer.

15. The smart window of claim 14, wherein a thickness of the first electrode layer is in a range of 1 nm to 1 µm.

16. The smart window of claim 1, further comprising a second electrode layer positioned between the second base layer and the second conductive layer.

17. The smart window of claim 16, wherein a thickness of the second electrode layer is in a range of 1 nm to 1 µm.

18. The smart window of claim 1, wherein the first base layer and the second base layer are formed of a polymer or a glass.

19. The smart window of claim 18, wherein the polymer includes at least one selected from a group including polyester, polyethylene terephthalate (PET), polyphenylene sulfide (PPS), polystyrene, polyamide, polycarbonate, polymethyl methacrylate (PMMA), and polyethylene naphthalate (PEN).

20. A smart window comprising:
a first base substrate having a first nanostructure thereon;
a second base substrate having a second nanostructure thereon;
a switch system for changing the voltage applied to the first and second nanostructures; and
an electrolyte layer between the first base substrate and the second base substrate and containing particles that precipitate on the first nanostructure or the second nanostructure in response to a voltage applied to at least one of the first nanostructure and the second nanostructure;
wherein the first nanostructure and the second nanostructure have different lengths such that particles that precipitate on the first nanostructure form a light-reflective surface and particles that precipitate on the second nanostructure form a light-absorbing surface, and
wherein the first nanostructure and the second nanostructure are electrically conductive.

21. The smart window of claim 20, wherein the particles are dispersed in the electrolyte layer while no voltage is applied to the first and second nanostructures, causing the smart window to be in transparent mode.

22. The smart window of claim 20, wherein the first base substrate and the second base substrates comprise a bendable polymer and the first nanostructure and the second nanostructure are part of irregularly-shaped layers with gaps.

23. The smart window of claim 20, wherein the first nanostructure is a part of an irregularly-shaped layer comprising parts that overlap, interconnect, and cross each other.

* * * * *